(12) United States Patent
Desikacharya Sampathu et al.

(10) Patent No.: US 7,097,867 B2
(45) Date of Patent: Aug. 29, 2006

(54) **PROCESS OF EXTRACTING CHILI (*CAPSICUM*) OLEORESIN**

(75) Inventors: Sathyagalam Ranganatha Desikacharya Sampathu, Institute Mysore (IN); Madeneni Madhava Naidu, Institute Mysore (IN); Halagur Bogegowda Sowbhagya, Institute Mysore (IN); Jarpla Pura Naik, Institute Mysore (IN); Nanjundalah Krishnamurthy, Institute Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 178 days.

(21) Appl. No.: 10/395,377

(22) Filed: Mar. 24, 2003

(65) Prior Publication Data

US 2004/0191364 A1    Sep. 30, 2004

(51) Int. Cl.
*A23L 1/222* (2006.01)

(52) U.S. Cl. .................... 426/51; 426/52; 426/651

(58) Field of Classification Search .................. 426/49, 426/50, 52, 534, 655, 51, 651; 424/760
See application file for complete search history.

(56) References Cited

U.S. PATENT DOCUMENTS

| 974,322 | A | 11/1964 | Maclyn Raypeat |
| 4,304,792 | A | 12/1981 | Sreenivasan et al. |
| 5,059,437 | A | 10/1991 | Todd, Jr. |
| 5,773,075 | A | 6/1998 | Todd |
| 5,888,574 | A | 3/1999 | Wissgott |

FOREIGN PATENT DOCUMENTS

| HU | 28 336 | 12/1983 |
| HU | 185 706 | 3/1985 |
| HU | 63 311 | 8/1993 |
| JP | 51-112561 | 10/1976 |
| JP | 51-142020 | 12/1976 |
| JP | 52-128924 | 10/1977 |
| JP | 54-052740 | 4/1979 |
| JP | 54-142236 | 11/1979 |
| JP | 55-118967 | 9/1980 |
| JP | 56-011960 | 2/1981 |
| JP | 56-011961 | 2/1981 |
| JP | 56-041259 | 4/1981 |
| JP | 57-031962 | 2/1982 |
| JP | 57-102955 | 6/1982 |
| JP | 57-117566 | 7/1982 |
| JP | 57-131259 | 8/1982 |
| JP | 57-133160 | 8/1982 |
| JP | 57-180663 | 11/1982 |
| JP | 58-173164 | 10/1983 |
| JP | 61-264061 | 11/1986 |
| JP | 62-115067 | 5/1987 |
| JP | 62-115068 | 5/1987 |
| JP | 20-38464 | 2/1990 |
| JP | 30-45657 | 2/1991 |
| JP | 2001-252043 | 9/2001 |
| KR | 93 10538 | 10/1993 |

OTHER PUBLICATIONS

Santamaria, R.I., "Selective Enzyme-Mediated Extraction of Capsaicinoids and Carotenoids from Chili Guajillo Puya (*Capsicum annuum* L.) Using Ethanol as Solvent", J. Agric. Food Chem., 48(7):3063-3067 (2000).

*Primary Examiner*—Keith Hendricks
(74) *Attorney, Agent, or Firm*—Morgan & Finnegan, LLP

(57) ABSTRACT

The present invention relates to a process for obtaining oleoresin of improved color and pungency from chili, the said process comprising steps of: treating powder or flakes of chili by mixing with a multi enzyme preparation, incubating at a particular range pH, drying the enzyme treated chili powder/flakes to bring down the moisture level of about 5–12%, powdering or pelletizing to a particle size of about 20–30 mesh, soaking and extracting using a mixture of solvent for a period ranging between 1h to 3h; repeating the extraction and pooling the extracts, and concentrating the pooled extract to obtain oleoresin with enriched pungency and color.

20 Claims, No Drawings

PROCESS OF EXTRACTING CHILI (*CAPSICUM*) OLEORESIN

FIELD OF THE INVENTION

The present invention relates to a process of extraction of chili (*Capsicum annum L*) oleoresin of improved yield. The invention also provides a process of recovering carotenoid pigment with improved recovery.

BACKGROUND AND PRIOR ART REFERENCES

Chilies are the dried ripe red fruits of the genus capsicum. The two well-known species are *Capsicum annum L.* and *Capsicum frutenscens L.* India is the largest producer and exporter of chilies. The estimated export of dry chilies from India was 75,000 MT tonnes valued Rs. 25580 lakhs in 2001–02.

Pungency and color are the two main quality attributes in chilies. The red color of chilies is due to the presence of carotenoid pigments like capsanthin, (major pigment, 35%) capsorubin, zeaxanthin, violaxanthin, cryptoxanthin, β-carotene etc. These pigments are present in chilies mainly in the esterified form, and to a small extent in non-esterified forms. The oleoresin of chilies is used in many processed foods like sausages, seafood, meat products etc. to impart a reddish taint and pungency. It is also used in chicken feed so that chicken meat and yolk will get an attractive reddish shade. For food colouration, pungency free, high color content chili oleoresins are desirable. Chili oleoresins as commercially produced vary in their pigment content and the color value ranges from 30,000 to 1,00,000 units as, measured by the method prescribed by the Essential oil Association of America (EOA). The color content of the oleoresin is directly proportional to the pigment concentration the raw material used. But preparation of oleoresin with high color values is desirable. The present invention relates to a process to upgrade the color value of pungency-free commercial chili oleoresin.

There are several patents on chili/paprika color, relating to the following aspects:
i. Methods for alcohol or oil extraction, usually after saponification with alkali (No. 31,522 Israel 1971, No. 76,142, 020, Japan 1976, No. 80,118,967, Japan 1980, No. 81,011,960, Japan 1981, No. 82,133,160, Japan 1982, No. 82,180,663, Japan 1982, and 83,173,164, Japan 1984).
ii. Pigment production by inter-esterification, No. 79,142, 236, Japan 1979).
iii. Methods for pigment stabilization or prevention of fading (54,010,568, Japan 1979 No. 55046, 147, Japan 1980, No. 76,112,561, Japan 1976) and
iv. Preparation of formulations for food use (81,011,961, Japan 1981).

Other patents relating to paprika color are as follows:
i. Method of preventing paprika color from fading (JP52128924, 1977),
ii. Production of paprika color involving the use of calcium hydroxide and solvent extraction (JP57131259, 1982),
iii. Production of paprika dyestuff by treating paprika extract with caustic alkali in presence of acetone (JP61264061, 1986),
iv. Improvement of paprika color stability to oxygen and light by blending with carrot extract and browning reaction product of a saccharide and amino acid (JP57031962, 1982),
v. Fade preventing agent for paprika pigment by adding a browning reaction product of a saccharide and an amino acid (JP56041259, 1981),
vi. Fade inhibition of paprika color by adding solvent extract of rosemary, sage or mixture thereof (JP57102955, 1982),
vii. Manufacture of odourless paprika colouring matter by absorption of alcohol extract of paprika on a resin of porus polymeric structure (JP3045657, 1991),
viii. Production of stable deodorise paprika pigment by bringing paprika oleoresin into contact with carbon dioxide in supercritical state in presence a polar solvent (JP2038464, 1990),
ix. Production of concentrate paprika pigment by treating paprika with lipase followed by solvent extraction (JP62115067, 1987),
x. Method for separating paprika pigment by silica gel chromatography (JP62115068, 1987),
xi. Manufacture of paprika oleoresin capsule by treatment with molto dextrin and modified starch (KR9310538, 1993),
xii. Method for production of colouring agent and flavouring material from paprika (HU63311, 1993),
xiii. Process for isolation of flavour and color from paprika (HU185706, 1985),
xiv. Method for obtaining aromatics and dyestuffs from bell peppers involving extraction with a solvent in a supercritical state (HU28336, 1983),
xv. Improvement of color stability by treatment with vegetables and fruits, which contain carotenoids (U.S. Pat. No. 5,888,574, 1999),
xvi. Natural food color composition involving mixture of edible materials including paprika and palm oil, carrot oil or corn gluten oil (U.S. Pat. No. 4,304,792, 1981),
xvii. High temperature counter current solvent extraction (U.S. Pat. No. 5,773,095, 1998),
xviii. Method of stabilising a spice extractive and a preservative product by using a small amount of metal deactivator such as an edible water soluble salt of ethylene such as diamine tetra acetic acid (GB974322, 1964),
xix. Color stabilised paprika composition using a natural antioxidant/oil soluble ascorbic acid ester (US19900525340, 19900518, 1991),
xx. Preparation of emulsified paprika color (JP2001252043, 2001), prevention of paprika pigment fading using caffeic acid ferulic acid, chlorogenic acid and some of their esters etc. (JP57117566, 1992).

The above patents do not teach or does not provide any clue regarding improved extraction of chili oeloresin and recovery of carotenoid.

According to a published paper by Santamaria et al., "Selective enzyme mediated extraction of capsaicinoids and carotenoids from chili guajillo puya (*Capsicum annum L*) using ethanol as solvent" in *J. Agric.Food Chem*. 2000, 48, 3063–3067, selective extraction of capsaicinoids and carotinoids from the Mexican chili Guajillo "puya" was studied. Ethanol was used as solvent for the extraction of carotenoids and capsaicin from chili powder treated with commercial enzymes (individually) containing a) pectolytic as well as hemicellulolytic: activities, (b) cellulotytic activity, (c) a wide variety of carbohydrase activities d) with pectin esterase and arabanase activities. It was recommended that, pre-treatment of the flour with a commercial enzyme namely VISCOZYME L (with a wide variety of carbohydrase activities having 120 units of fungal β-glucanase (FBG)/ml)

at 5% level on chili powder helped to get an increased yield of 11% for carotenoid and 7% for capsaicinoids respectively, over control chili powder.

In the present patent proposal using two commercial enzymes namely (a) EXTRAZYME (with declared activity of 7500 pectinase S units and a multi-enzyme complex containing a vide range of carbohydrases, including arabanase, cellulase, β-glucanase, hemi-cullalase, and xylanase and (b) ENERGEX, in powder or liquid form, with declared activities of 50–120 fungal β-glucanase per gram or ml and 5000 to 12000 PSU per gram or ml.

The method reported in the publication referred to above, has many disadvantages, which are overcome in the present patent application.

1) As per the paper, the chili powder to water ratio is very high being of the order of 1:50 which needs to be dried before extraction. This step of removal of water in large quantities involves time and energy, which would make the processes uneconomical. In the present patent proposal material to water ratio for enzyme treatment is far less (1:1) which makes the drying step easier and faster
2) Enzyme addition to the chili powder as reported in the paper ranges from 1–5% and actually the authors recommend 5% of the enzyme. In the present patent proposal maximum level required is 1% only.
3) The increase in the yields of carotenoids and capsaicinoids as per the referred paper is 10% for carotenoids and 7% for capsaicinoids over the control batch. In contrast to this in the proposed patent, the increase in yields of carotenoids and capsicinoids is of the order of 24% and 32% respectively, which is very much higher.
4) The solvent used in the publication is aqueous alcohol or pure alcohol. In the proposed patent a mixture of solvents with an advantage of improved extractability for chili constituents namely, carotenoids and capsaicin has been employed
5) Commercial scale adaptation is feasible for the process claimed in the patent application In the spice extraction industry, chili oleoresin is produced by extraction of chili powder with solvents such as acetone, ethylene dichloride and hexane followed by desolventization to get a deep red coloured, viscous material called the oleoresin. The oleoresin contains the constituents responsible for color namely carotenoids, the pungent constituents mainly capsaicin and dihydrocapsaicin, besides other soluble components such as fats and waxes.

The present patent aims at enhancing the extractability of chili constituents especially pigments and capsaicinoids by a combination of two techniques namely enzyme treatment and extraction with selected solvent mixtures.

OBJECTS OF THE INVENTION

The main object of the present invention is to provide a process for recovering chili oleoresin and caroteniod.

Another object of the invention is to provide a process for obtaining oleoresin of improved color and pungency from chili.

Still another object of the invention is to provide a process of extracting oleoresin and carotenoid pigment using an enzyme with solvent to obtain improved quality of resin.

Still another object of the invention is to provide a process of extracting oleoresin and carotenoid pigment using a combination of enzyme and binary solvent system.

One more object of the invention is to provide a process for obtaining chilli flakes as a starting material for the above extraction process.

SUMMARY OF THE INVENTION

Accordingly, the present invention provides a process for obtaining oleoresin of improved color and pungency from chili, the said process comprising steps of: treating powder or flakes of chili by mixing with a multi enzyme preparation, incubating at a particular range pH, drying the enzyme treated chili powder/flakes to bring down the moisture level of about 5–12%, powdering or pelletizing to a particle size of about 20–30 mesh, soaking and- extracting using a mixture of solvent for a period ranging between 1 h to 3 h; repeating the extraction and pooling the extracts, and concentrating the pooled extract to obtain oleoresin with enriched pungency and color.

DETAILED DESCRIPTION OF THE INVENTION

Accordingly, the present invention provides a process for obtaining oleoresin of improved color and pungency from chili, the said process comprising steps of:
  i) treating powder or flakes of chili by mixing with a multi enzyme preparation, incubating at a pH in the range of 4.0 to 7.0 for a time period of 2 h to 24 h and at a temperature in the range of 200 to 50° C.,
  ii) drying the enzyme treated chili powder/flakes of step (i) to bring down the moisture level of about 5–12%,
  iii) powdering or pelletizing the contents of step (ii) into a particle size of about 20–30 mesh,
  iv) loading the chilli powder or its pellets into extraction column and soaking in a mixture of solvent for a period ranging between 1 h to 3 h;
  v) draining and collecting the solvent extract of step (iv) or to leave behind soaked chili powder or pellet,
  vi) extracting further the soaked powder or pellet of step (v) with solvent mixture,
  vii) repeating the steps (iv) to (vi), pooling the extracts, and
  viii) concentrating the pooled extract to obtain oleoresin with enriched pungency and color.

An embodiment of the invention, the raw material for the extraction selected is either chili or paprika.

Another embodiment of the invention provides a process wherein the multienzyme preparation used belongs to the endo-1,3 (4) β-glucanase class enzymes consisting of pectinase, betaglucanase and hemicellulase.

Still in another embodiment, the pectinase used has an activity in the range of 50 to 120 fungal betaglucanase units per gram and pectinase 5000–12000 psu/g.

Still in another embodiment, the w/w ratio of enzyme preparation to chili powder/flakes used is in the range of 0.1–1.0 to 1.0 to 100.0.

Yet in another embodiment, the chili powder is converted to pellets of size up to 1-cm diameter and up to 15-mm length using commercially available pelletizing machine.

Yet in another embodiment, the solvents used is selected from polar, non-polar or mixture thereof.

Yet in another embodiment, the ratio of polar solvent: non-polar solvent used is in the range of 20:80 to 60:40.

Yet in another embodiment, the polar solvent used is selected from a group consisting of ketonic solvents selected from acetone, isobutyl ketone, methyl-ethyl ketone, methyl isobutyl ketone, ethyl acetate, propyl acetate, butyl acetate or mixtures thereof.

Yet in another embodiment, the non-polar solvent used is selected from a group consisting of hexane, petroleum ether or mixtures thereof.

Yet in another embodiment, the solvent mixture used is ethyl acetate: hexane or acetone: hexane.

Yet in another embodiment, the ratio of starting material to the solvent used is in the range of 1:6 to 1:12.

Yet in another embodiment, the pooled extract, is concentrated upto 95% under atmospheric pressure.

Yet in another embodiment, the final stripping of the solvent from the pooled extract is carried out by live steam and/or indirect and azeotropic distillation.

Yet in another embodiment, the process may be carried out either by batch process or a continuous process comprising multiple extraction columns.

Yet in another embodiment, the solvent used for extraction is recycled in order to enrich the yield.

Yet in another embodiment, the recovery of the oleoresin is up to 98.00 percent.

Yet in another embodiment, the carotenoid pigment recovery is up to 95.00 percent.

Yet in another, embodiment, the percentage yield of oleoresin obtained is upto 12.00.

Yet in another embodiment, the oleoresin obtained has a color value of upto 72,000.

Yet in another embodiment, the percentage of capsaicin content of oleoresin obtained is up to 1.70.

Still another embodiment of the present invention relates to a process of obtaining chili flakes as a starting material, said process comprising steps of:
  a) drying the commercially available chili, after precleaning, to a moisture level in the range of 5 to 8 percent,
  b) followed by grinding in a mill to obtain a mixture of pericarp flakes and seeds which is sieved to get two parts namely bigger percarp free of seeds and a mixture of smaller pericarp flakes and seeds;
  c) segregating the mixture of smaller pericarp flakes and seeds to air aspiration using a commercially available air aspirator to obtain seeds and pericarps,
  d) powdering the percarps of step (b) and (c) using a hammer mill fitted with mesh sieve of size 20 to 40 to obtain the required starting material for extraction.

The process consists of first subjecting commercially available chili for thorough cleaning to remove any extraneous matter. This is followed by separation of seeds and flakes followed by grinding of the flakes to powder using a suitable grinder. This is followed by treating the pericarp powder with an aqueous solution of an enzyme mixture designed to cause cell wall degradation, and consisting of constituent enzymes namely, cellulose, hemicellulose, amylase, pectinase, arabinase, B-glucanase and xylanase. The enzyme treated chili powder is held at optimum temperature for enzyme action. The chili powder is dried to a, moisture level of 15% or 8% depending on whether the powder is subjected to pelletization or extracted as a powder, respectively. The pellets are dried to moisture content of about 8%. The pellets or the powder is loaded in to columns and extracted with binary solvent mixtures drawn from hexane, acetone, ethyl acetate, ethyl methyl ketone and petroleum ether. It has been found that the selected binary solvent mixtures are more efficient for the extraction of chili constituents as compared to the individually pure solvents. This results in reduction of processing time and also lesser use of solvents, besides improved recovery of the principal constituents namely, carotenoid pigments and pungent principles, which are mainly capsaicin and dihydro capsaicin. The extract or miscella is subjected to distillation under controlled conditions to maximaize the recovery of the solvent and minimize the loss of pigments and to produce an oleoresin of improved color value and capsaicin content.

The solvent mixture adsorbed onto the spent chili powder/pellets are recovered by passing steam through the bed of the material and condensing the vapors. In the case of water im-miscible solvent mixture, such as ethyl acetate and hexane, the aqueous layer easily separated by draining out from condensate. In the case of a solvent mixture such as hexane and acetone, hexane is recovered as a separated layer and the acetone in the aqueous layer of the condensate is recovered by fractional distillation.

Novelty
1. Chili or paprika powder/pellets is treated with an enzyme mixture, which facilitates better release of chili constituents namely pigments and pungency for extraction purposes.
2. A mixture of binary solvents selected for higher efficiency in terms of extractability of chili constituents is employed for extraction in place of conventional single solvents.
3. The solvent mixtures are prepared by mixing by volume 90 to 10 parts of polar solvents like acetone, ethyl acetate or methyl ethyl ketone with 10 to 90 parts of non-polar solvents like hexane or petroleum ether.

The following examples are given by way of illustration of the present invention and therefore should not be construed to limit the scope of the present invention.

EXAMPLE 1

Byadgi variety of dried red chili was procured locally and it was dried at 50° C. for two hours in order to bring down the moisture to nearly 5%. The crisp dry chili was passed through a hammer mill with a suitable sieve in order to get a mixture of pericarp flakes and seeds. This mixture was passed through a smaller mesh sieve to get two fractions namely, a) bigger flakes of pericarp free of seeds b) a mixture of smaller flakes and seeds. This mixture of smaller flakes and seeds was passed through an air-aspirator, which resulted in two desired fractions namely pure seeds and pericarp. The preicarp contained a small amount of seeds (3–5%). The two pericarp fractions were mixed and was powdered in a hammer mill fitted with 30 mesh sieve to get a powder which was used as the raw material for conversion into pellets and for extraction studies. The powder (30 g) was loaded in a glass column and extracted with a solvent mixture containing 60 parts of Acetone, and 40 parts of Hexane, by volume. After the solvent addition a contact time of 2 hours was given and extract (60 ml) was drained out while simultaneously adding fresh solvent mixture on to the material in the column to keep it soaked. Totally 6 more such extracts were taken after a contact time of 1 hour every time. The extracts were pooled (240 ml) and desolventized in a rota evaporator at atmospheric pressure till nearly 220 ml of the solvent was recovered. Rest of the distillation was carried out under reduced pressure of 20' and a temperature of less than 60° C. using a suction pump till solvent was almost completely removed. At the final stages of distillation the unit was connected to a vacuum pump at a vacuum of 26' and a temperature below 80° C. for a period of 15 minutes by which time the solvent smell was fully removed from the product (3.8 g). The color value and capsaicin content in this oleoresin 64,100 and 1.54%. A controlled batch of extraction was also carried out under similar conditions as per the solvent mixtures. The oleoresin yield was 3.8 g and its color value and capsaicin content were 57800 and 1.24% respectively. In another control batch of extraction hexane was used as the solvent under similar conditions. The yield of resin was 3.7 g and its color value and capsaicin content were 59,000 and 0.83% respectively.

EXAMPLE 2

Byadgi variety of dried red chili was procured locally. Reduction of moisture to a level of around 5%, breaking of capsules, sieving and air aspiration, separation of pericarp from seeds was carried out as described in example 1. The flakes were ground using a hammer mill to pass through 30-mesh sieve. A multi enzyme preparation was added as a suspension in water, at the concentration of 0.5% and pH 4.0, to chili pericarp powder (200 g batch) and incubated at 37° C. for 12 hours. The control sample i.e. without enzyme addition was also maintained under similar conditions of moisture (30%), pH and temperature. After the incubation period both samples were air dried at 50° C. using a conventional dryer to bring down the moisture level to about 8%. The treated and control samples, 75 gm each, were loaded in to separate glass columns and extracted with selected solvents, at a material to solvent ratio of 1:12. The following solvent mixers namely, Ethyl acetate plus Hexane (60+40) and Acetone plus Hexane mixture (60+40) were used for extraction Recoveries of chili constituents with reference to resin, carotenoid pigments and capsaicin were computed and comparative profile is presented in table.1. The color value in the resin and capsaicin in the resin were higher in enzyme treated chili powder in comparison to control.

TABLE 1

Effect of enzyme treatment and extraction with solvent mixtures on the recovery of chili constituents

| S.No. | Treatment | Resin yield (%) | Color value of resin | Capsaicin in oleoresin (%) |
| --- | --- | --- | --- | --- |
| 1 | Control-Acetone pure | 12.60 | 57800 | 1.24 |
| 2 | Control, Acetone plus Hexane (60 + 40) | 12.70 | 64050 | 1.54 |
| 3 | Enzyme treated A + H (60 + 40) | 11.59 | 71370 | 1.64 |
| 4 | Control, EA + H (60 + 40) | 12.15 | 63608 | 1.42 |
| 5 | Enzyme treated EA + H (60 + 40) | 11.50 | 71966 | 1.65 |

A: Acetone,
H: Hexane,
EA: Ethyl acetate

EXAMPLE 3

Byadgi variety of dried red chili was procured locally. The operations of ion of moisture to a level of around 5%, breaking of capsules, sieving and air aspiration for separation of pericarp from seeds were carried out as described in example 1. The flakes were ground using a hammer mill to pass through 30-mesh sieve. Chili pericarp powder was conditioned for pelletization by uniformly mixing with water added at 8% by weight. The conditioned powder was charged to the pelletizing machine fitted with a die of 6 mm diameter. The pellets obtained were dried to a moisture level of 8% using a cross-flow drier. A twenty grams of the pellets were into glass columns and extracted separately with the following solvents and solvent mixtures namely, Hexane, Acetone, Ethyl acetate, Acetone+Hexane (60+40) and Ethyl acetate+Hexane (60+40) at a material to solvent ratio of 1:12. The relative ability with reference to resin and carotenoid pigments is presented in Table 2.

TABLE 2

Effect of Solvent Composition on the Recovery of Resin and Pigments from Chili Pericarp (6 Mm Pellets)

| | Resin recovery (%) | | Pigment recovery (%) | |
| --- | --- | --- | --- | --- |
| SOLVENT (S) | Material to solvent ratio (1:8) | Material to solvent ratio (1:10) | Material to solvent ratio (1:8) | Material to solvent ratio (1:10) |
| Hexane | 87.76 | 91.13 | 78.44 | 82.47 |
| Acetone | 86.98 | 87.65 | 80.35 | 84.70 |
| Ethyl Acetate | 86.16 | 89.98 | 77.29 | 85.06 |
| Acetone + Hexane [60 + 40] | 95.65 | 98.35 | 90.33 | 95.01 |
| Ethyl Acetate + Hexane [60 + 40] | 92.35 | 95.15 | 85.93 | 90.37 |

The recoveries of resin and pigment pure higher for the stated solvent mixtures than for pure solvents the hexane, acetone or ethyl acetate.

Advantages of this process are
1. There is increased recovery of color and pungency from chili powder and pellets.
2. The prepared oleoresin is of higher color value and capsaicin content.
3. There is reduction in solvent requirement and in processing time for making the oleoresin.

We claim:

1. A process for obtaining oleoresin of improved color and pungency from chili, the said process comprising steps of:
   i) treating powder or flakes of chili by mixing with an enzyme preparation, incubating at a pH in the range of 4.0 to 7.0 for a time period of 2 h to 24 h and at a temperature in the range of 20° to 50° C.,
   ii) drying the enzyme treated chili powder or flakes of step (i) to reduce the moisture level to about 5–12%,
   iii) powdering or pelletizing the contents of step (ii) into a particle size of about 20–30 mesh,
   iv) loading the chili powder or its pellets into an extraction column and soaking in a solvent mixture for a period ranging between 1 h to 3 h;
   v) draining and collecting the solvent extract of step (iv) or soaking the chili powder or pellet,
   vi) extracting further the soaked powder or pellet of step (v) with solvent mixture,
   vii) repeating the steps (iv) to (vi), pooling the extracts, and
   viii) concentrating the pooled extract to obtain oleoresin with enriched pungency and color,
wherein the solvent mixture comprises a polar solvent and a non-polar solvent, wherein in step (i), a w/w ratio of enzyme preparation to chili powder/flakes used ranges from 0.1–1.0 to 1.0–100.0 and the enzyme preparation is β-glucanase.

2. The process as claimed in claim 1, wherein the powder or flakes is paprika powder or pellets.

3. A process as claimed in claim 1, wherein the enzyme preparation used is endo-1, 3 (4) β-glucanase.

4. The process of claim 3, wherein the endo-1, 3 (4) β-glucanase comprises pectinase having an activity in the range of 50 to 120 fungal β-glucanase units per gram and pectinase of 5000–12000 psu/g.

5. The process as claimed in claim 1, wherein the chili powder is converted to pellets of size up to 1-cm diameter and up to 15-mm length using a commercially available pellitizing machine.

6. The process as claimed in claim 1, wherein the polar solvent and non-polar solvent have a ratio of polar solvent:non-polar solvent in the range of 20:80 to 60:40.

7. The process as claimed in claim 1, wherein the polar solvent is selected from a group consisting of ketonic solvents selected from acetone, isobutyl ketone, methylethyl ketone, methyl isobutyl ketone, ethyl acetate, propyl acetate, butyl acetate and mixtures thereof.

8. The process as claimed in claim 1, wherein the non-polar solvent is selected from a group consisting of hexane, petroleum ether and mixtures thereof.

9. The process as claimed in claim 1, wherein in step (iv) the solvent mixture used is ethyl acetate: hexane or acetone: hexane.

10. The process as claimed in claim 1, the ratio of starting material to the solvent used is in the range of 1:6 to 1:12.

11. The process of claim 1, wherein in step (vii) the pooled extract, is concentrated up to 95% under atmospheric pressure.

12. The process of claim 1, wherein in step (vii) the solvent is finally removed from the pooled extract by live steam and/or indirect and azeotropic distillation.

13. The process as claimed in claim 1, wherein the process is a batch process or a continuous process comprising multiple extraction columns.

14. The process as claimed in claim 1, wherein the solvent used for extraction is recycled in order to enrich the yield.

15. The process as claimed in claim 1, wherein the recovery of the oleoresin is in a range up to about 98 percent.

16. The process as claimed in claim 1, wherein the carotenoid pigment recovery is in a range up to about 95 percent.

17. The process of claim 1, wherein the percentage yield of oleoresin obtained is in a range up to about 12.

18. The process of claim 1, wherein the oleoresin obtained has a color value in a range of up to about 72,000.

19. The process of claim 1, wherein the percentage of capsacin content of oleoresin obtained is in a range up to about 1.70.

20. The process as claimed in claim 1, wherein the chili flakes are obtained by:
(a) drying the chili, after pre-cleaning, to a moisture level in the range of 5 to 8 per cent,
(b) followed by grinding in a mill to obtain a mixture of pericarp flakes and seeds which is sieved to get two parts namely bigger pericarp free of seeds and a mixture of smaller pericarp flakes and seeds,
(c) segregating the mixture of smaller pericarp flakes and seeds to air aspiration using an air aspirator to obtain seeds and pericarps, and
(d) powdering the pericarps of step (b) and (c) using a hammer mill fitted with mesh sieve of size 20 to 40 to obtain the required starting material for extraction.

* * * * *